United States Patent
Biehn et al.

(10) Patent No.: US 8,115,774 B2
(45) Date of Patent: Feb. 14, 2012

(54) APPLICATION OF SELECTIVE REGIONS OF A NORMAL MAP BASED ON JOINT POSITION IN A THREE-DIMENSIONAL MODEL

(75) Inventors: Christoph Alexander Biehn, La Jolla, CA (US); Donald J. Hamilton, San Diego, CA (US)

(73) Assignee: Sony Computer Entertainment America LLC, Foster City, CA (US)

( * ) Notice: Subject to any disclaimer, the term of this patent is extended or adjusted under 35 U.S.C. 154(b) by 253 days.

(21) Appl. No.: 11/460,936

(22) Filed: Jul. 28, 2006

(65) Prior Publication Data

US 2008/0024511 A1 Jan. 31, 2008

(51) Int. Cl.
*G06T 13/00* (2011.01)
(52) U.S. Cl. ........ 345/582; 345/473; 345/620; 345/621; 345/622; 345/623; 345/624; 345/625; 345/626; 345/627; 345/628; 345/629
(58) Field of Classification Search .......... 345/620–629, 345/473, 582
See application file for complete search history.

(56) References Cited

U.S. PATENT DOCUMENTS

| | | | | |
|---|---|---|---|---|
| 4,276,570 A | * | 6/1981 | Burson et al. | 382/276 |
| 4,602,286 A | * | 7/1986 | Kellar et al. | 348/597 |
| 5,384,912 A | * | 1/1995 | Ogrinc et al. | 345/501 |
| 5,680,531 A | * | 10/1997 | Litwinowicz et al. | 345/473 |
| 5,754,180 A | * | 5/1998 | Kivolowitz et al. | 345/418 |
| 5,781,198 A | * | 7/1998 | Korn | 345/634 |
| 5,808,619 A | * | 9/1998 | Choi et al. | 345/426 |
| 5,900,881 A | * | 5/1999 | Ikedo | 345/426 |
| 5,995,119 A | * | 11/1999 | Cosatto et al. | 345/473 |
| 6,072,496 A | * | 6/2000 | Guenter et al. | 345/419 |
| 6,091,422 A | * | 7/2000 | Ouaknine et al. | 345/419 |
| 6,118,459 A | * | 9/2000 | Hunter | 345/474 |
| 6,300,960 B1 | * | 10/2001 | DeRose et al. | 345/474 |
| 6,407,743 B1 | * | 6/2002 | Jones | 345/582 |
| 6,417,854 B1 | * | 7/2002 | Isowaki et al. | 345/473 |
| 6,478,680 B1 | * | 11/2002 | Yoshioka et al. | 463/43 |
| 6,525,740 B1 | * | 2/2003 | Cosman | 345/584 |
| 6,677,942 B1 | * | 1/2004 | Rushmeier et al. | 345/420 |
| 6,828,972 B2 | * | 12/2004 | Zhang et al. | 345/473 |
| 6,891,550 B1 | * | 5/2005 | Nolan | 345/619 |

(Continued)

FOREIGN PATENT DOCUMENTS

JP 2006506742 A 2/2006

(Continued)

OTHER PUBLICATIONS

The A-buffer, an Antialiased Hidden Surface Method Loren Carpenter Computer Graphics, vol. 18, No. 3, Jul. 1984 (ACM).*

(Continued)

*Primary Examiner* — Xiao M. Wu
*Assistant Examiner* — Todd Buttram
(74) *Attorney, Agent, or Firm* — Fitch, Even, Tabin & Flannery LLP

(57) ABSTRACT

A method. for use in animation includes the steps of establishing a model having a plurality of joints, exposing a region of a first normal map based on a position of one or more of the joints, and applying the exposed region of the first normal map to the model. A system for use in animation is configured to accomplish these steps.

30 Claims, 15 Drawing Sheets

U.S. PATENT DOCUMENTS

| | | | | |
|---|---|---|---|---|
| 6,972,774 | B2 * | 12/2005 | Eguchi | 345/629 |
| 7,095,418 | B2 * | 8/2006 | Levene et al. | 345/582 |
| 7,167,189 | B2 * | 1/2007 | Di Lelle et al. | 345/677 |
| 7,179,171 | B2 * | 2/2007 | Forlines et al. | 463/41 |
| 7,221,809 | B2 * | 5/2007 | Geng | 382/280 |
| 7,245,305 | B2 * | 7/2007 | Lake et al. | 345/582 |
| 7,298,374 | B2 * | 11/2007 | Styles | 345/473 |
| 7,433,753 | B2 * | 10/2008 | Okada et al. | 700/130 |
| 2001/0022586 | A1 * | 9/2001 | Hino et al. | 345/473 |
| 2001/0055026 | A1 * | 12/2001 | Cosman et al. | 345/611 |
| 2002/0158880 | A1 * | 10/2002 | Williams et al. | 345/582 |
| 2003/0137515 | A1 * | 7/2003 | Cederwall et al. | 345/473 |
| 2003/0193503 | A1 * | 10/2003 | Seminatore et al. | 345/473 |
| 2004/0085320 | A1 * | 5/2004 | Kudoh et al. | 345/473 |
| 2005/0179687 | A1 * | 8/2005 | Anderson et al. | 345/424 |
| 2005/0212812 | A1 * | 9/2005 | Anderson et al. | 345/589 |
| 2005/0248582 | A1 * | 11/2005 | Scheepers et al. | 345/586 |
| 2005/0275760 | A1 * | 12/2005 | Gritz et al. | 348/746 |
| 2006/0022991 | A1 * | 2/2006 | Scheepers et al. | 345/582 |
| 2006/0146063 | A1 * | 7/2006 | Ohba | 345/584 |
| 2006/0244764 | A1 * | 11/2006 | Ahmad | 345/629 |
| 2007/0229498 | A1 * | 10/2007 | Matusik et al. | 345/420 |
| 2008/0024487 | A1 * | 1/2008 | Isner et al. | 345/420 |
| 2008/0024511 | A1 * | 1/2008 | Biehn et al. | 345/582 |
| 2008/0129738 | A1 * | 6/2008 | Kim et al. | 345/473 |
| 2008/0267443 | A1 * | 10/2008 | Aarabi | 382/100 |

FOREIGN PATENT DOCUMENTS

| | | |
|---|---|---|
| JP | 2006163944 A | 6/2006 |
| WO | 2004047009 A2 | 6/2004 |

OTHER PUBLICATIONS

Compositing Digital Images Porter, et al. Computer Graphics vol. 18, No. 3, Jul. 1984.*

Blue Screen Matting Smith, et al. pp. 259-268 1996 ACM.*

Alpha and the History of Digital Compositing Microsoft Technical Memo 7 Alvy Ray Smith Aug. 15, 1995.*

Animated Wrinkle Maps SIGGRAPH 2007, Advanced Real-Time Rendering in 3D Graphics and Games Course, Chapter 4. Christopher Oat.*

Bando, Y. et al.; "A Simple Method for Modeling Wrinkles on Human Skin;" 2002; Proceedings of the 10th Pacific Conference on Computer Graphics and Applications (PG '02); IEEE; pp. 1-10.*

DeMartini, Kris; "Expressive Normal Mapping;" Jun. 21, 2006; pp. 1-7.*

Reis, C. et al.; "Real-time Simulation of Wrinkles;" The 16th International Conference in Central Europe on Computer Graphics, Visualization and Computer Vision—WSCG'2008 Communication Papers. Pilsen: University of West Bohemia, Czech Republic, 2008. p. 109-115.*

Kahler, K. et al.; "Head shop: Generating animated head models with anatomical structure;" 2002; ACM; pp. 55-63 and 190.*

Guenter, B. et al.; "Making Faces;" 1998; ACM (Association for Computing Machinery); pp. 1-12.*

Zhang, Q. et al.; "Geometry-Driven Photorealistic Facial Expression Synthesis;" Jan./Feb. 2006; IEEE Transactions on Visualization and Computer Graphics; pp. 48-60.*

Noh; Jun-yong et al.; "Expression Cloning;" 2001; Proceedings of the 28th annual conference on Computer graphics and interactive techniques; pp. 277-288.*

DeMartini, K. "Expressive Normal Mapping" [online] Jun. 21, 2006 [retrieved on Nov. 5, 2008]. Retrieved from the Internet: <URL:http:// www.krisdemartini.com/expressive_normal_mapping.pdf>.*

Ben Cloward, "Resources-Tutorials", www.bencloward.com, last updated Jul. 4, 2005, pp. 1-2, published at http://www.bencloward.com/resources_tutorials.shtml.

Ben Cloward, "Normal Maps: Part I, Creating and Using Normal Maps: Introduction", www.bencloward.com, last updated Jul. 4, 2005, pp. 1-2, published at http://www.bencloward.com/tutorials_normal_maps1.shtml.

Ben Cloward, "Normal Maps: Part I, Creating and Using Normal Maps: Enter the Normal Map", www.bencloward. com, last updated Jul. 4, 2005, pp. 1-4, published at http://www.bencloward.com/tutorials_normal_maps2.shtml.

Ben Cloward, "Normal Maps: Part I, Creating and Using Normal Maps: What You Will Need", www.bencloward.com, last updated Jul. 4, 2005, pp. 1-2, published at http://www.bencloward.com/tutorials_normal_maps3.shtml.

Ben Cloward, "Normal Maps: Part I, Creating and Using Normal Maps: Creating Normal Maps from Bump Maps", www.bencloward.com, last updated Jul. 4, 2005, pp. 1-4, published at http://www.bencloward.com/ tutorials_normal_maps4.shtml.

Ben Cloward, "Normal Maps: Part I, Creating and Using Normal Maps: Normal Maps for High Poly Detail", www.bencloward.com, last updated Jul. 4, 2005, pp. 1-6, published at http://www.bencloward.com/tutorials_normal_maps5.shtml.

Ben Cloward, "Normal Maps: Part I, Creating and Using Normal Maps: Applying Normal Maps to Your Model", www.bencloward.com, last updated Jul. 4, 2005, pp. 1-6, published at http://www.bencloward.com/ tutorials_normal_maps6.shtml.

Ben Cloward, "Normal Maps: Part I, Creating and Using Normal Maps: Additional Tips and Tricks", www.bencloward.com, last updated Jul. 4, 2005, p. 1, published at http://www.bencloward.com/tutorials_normal_maps7. shtml.

Ben Cloward, "Normal Maps: Part I, Creating and Using Normal Maps: Links to Additional Information", www.bencloward.com, last updated Jul. 4, 2005, pp. 1-3, published at http://www.bencloward.com/tutorials_normal_maps8.shtml.

Ben Cloward, "Normal Maps: Part II—Beyond The Basics: Introduction", www.bencloward.com, last updated Jul. 4, 2005, pp. 1-2, published at http://www.bencloward.com/tutorials_normal_maps9.shtml.

Ben Cloward, "Normal Maps: Part II—Beyond The Basics: Tips for Creating Models", www.bencloward.com, last updated Jul. 4, 2005, pp. 1-4, published at http://www.bencloward.com/tutorials_normal_maps10.shtml.

Ben Cloward, "Normal Maps: Part II—Beyond The Basics: Methods for Creating Normal Maps", www.bencloward.com, last updated Jul. 4, 2005, pp. 1-4, published at http://www.bencloward.com/tutorials_normal_maps11.shtml.

Ben Cloward, "Normal Maps: Part II—Beyond the Basics: Tips for Editing Normal Maps", www.bencloward.com, last updated Jul. 4, 2005, pp. 1-6, published at http://www.bencloward.com/tutorials_normal_maps12.shtml.

European Patent Office, "European Search Report," issued in corresponding European Application No. EP07252872, Jan. 23, 2009, 10 pages.

Steve Rotenberg, "CSE 169: Computer Animation—Chapter 6: Facial Expressions & Rigging," Computer Graphics Laboratory [Online] XP002503536 UCSD—University of California at San Diego, May 21, 2005, 10 pages, Retrieved from Internet: http://web.archive.org/web/20050521212523/http://graphics.ucsd.edu/courses/cse169_w05/CSE169_06.ppt> [retrieved on Nov. 5, 2008].

Steve Rotenberg, "CSE 169: Computer Animation—Winter 2005 (Schedule)", Computer Graphics Laboratory [Online] XP002504948 UCSD—University of California at San Diego, Apr. 6, 2005, 3 pages, Retrieved from Internet: http://web.archive.org/web/20050406083434/http://graphics.ucsd.edu/courses/cse169_x05/> [retrieved on Nov. 19, 2008].

Alex Mohr and Michael Gleicher, "Building Efficient, Accurate Character Skins from Examples," ACM Transactions on Graphics, ACM, US, vol. 22, No. 2, Jul. 1, 2003, pp. 562-568, XP002468240 ISSN: 0730-0301.

European Patent Office; "Communication Pursuant to Article 94(3) EPC" (Examination Report) issued in corresponding European Application No. 07252872.2-2218/1887525; dated Sep. 3, 2009; 1 page.

CG World, Japan; Article related to secrets for creating latest video game; CG World, Japan, vol. 73, pp. 63-69, issued on Sep. 1, 2004 by Works Corporation.

Rintaro Fukuda; Article related to world's plug in; CG World, Japan, vol. 70, pp. 78-79, issued on Jun. 1, 2004 by Works Corporation.

Sadatake Takegi; Article related to amusement image expedition; CG World, Japan, vol. 93, pp. 94-97, issued on May 1, 2006 by Works Corporation.

Hiroshi Yoshii; "Pixologic Zmapper, ZappLink, Displacement Exporter"; CG World, Japan, vol. 91, pp. 136, issued on Mar. 1, 2006 by Works Corporation.

Japanese Patent Office; "Notice of Reason(s) for Refusal" issued in Japanese Patent Application No. JP 2007-198144; dated May 18, 2010; 8 pages.

European Patent Office; Second Examination Report for Corresponding European App. No. 07252872.2; Mailed Jul. 6, 2010; 5 pages.

European Patent Office; Summons to Attend Oral Proceedings Pursuant to Rule 115(1) EPC; for Corresponding European App. No. 07252872.2; Mailed Sep. 8, 2011; 8 pages.

* cited by examiner

APPLICATION OF SELECTIVE REGIONS OF A NORMAL MAP BASED ON JOINT POSITION IN A THREE-DIMENSIONAL MODEL

BACKGROUND OF THE INVENTION

1. Field of the Invention

The present invention relates generally to computer graphics and animation, and more specifically to the use of normal maps in lighting pixels when rendering three-dimensional computer models in real-time.

2. Discussion of the Related Art

The process of per-pixel lighting in a three-dimensional computer model uses the surface normal and the light vector at each pixel to calculate the brightness of the pixel. A surface normal is like an arrow that points in the direction that the surface of the model is facing. A light vector is a line from the point on the surface to the position of the light. As the angle between the surface normal and the light vector gets greater, the color of the pixel gets darker (and vice versa).

Texture mapping is the process of applying a texture, i.e. an image, to the surface of a computer model during rendering wherein the texture gets mapped onto the surface. The surface normal at each pixel is used along with the color values in the texture map to determine the lighting for each pixel.

A normal map is similar to a texture map but includes surface normal data instead of color values. More specifically, a normal map includes data that alters the original surface normals of the model.

It is with respect to these and other background information factors that the present invention has evolved.

SUMMARY OF THE INVENTION

One embodiment provides a method for use in animation, comprising the steps of: establishing a model having a plurality of joints; exposing a region of a first normal map based on a position of one or more of the joints; and applying the exposed region of the first normal map to the model.

Another embodiment provides a system for use in animation, comprising: means for establishing a model having a plurality of joints; means for exposing a region of a first normal map based on a position of one or more of the joints; and means for applying the exposed region of the first normal map to the model.

Another embodiment provides a computer program product comprising a medium for embodying a computer program for input to a computer and a computer program embodied in the medium for causing the computer to perform steps of: establishing a model having a plurality of joints; exposing a region of a first normal map based on a position of one or more of the joints; and applying the exposed region of the first normal map to the model.

A better understanding of the features and advantages of various embodiments of the present invention will be obtained by reference to the following detailed description and accompanying drawings which set forth an illustrative embodiment in which principles of embodiments of the invention are utilized.

BRIEF DESCRIPTION OF THE DRAWINGS

The above and other aspects, features and advantages of embodiments of the present invention will be more apparent from the following more particular description thereof, presented in conjunction with the following drawings wherein.

DETAILED DESCRIPTION

Computer animation involves building an animated three-dimensional (3D) figure on the computer monitor that is rigged with a virtual skeleton. A full wire frame model, or a model built of polygons, is formed that typically includes a plurality of joints (sometimes called "bones") that allow the model to move into different positions or poses. Surfaces, such as skin, eyes, mouth, etc., are added to the model during the rendering process.

The three-dimensional models used in video games are typically limited to being relatively low resolution, i.e. having a low polygon count, due to the models having to be rendered in real-time. Normal maps can be used to give a low resolution model the appearance of a high resolution model, i.e. a model having a high polygon count. In general, this can be done by taking surface detail from an actual high resolution model and putting it into a normal map, and then applying the normal map to the low resolution model similar to the way a texture map would be applied.

More specifically, the normal map in this scenario includes the direction information for the surface normals from the actual, more detailed high resolution model. When the normal map is applied to the low resolution model, the direction information in the normal map is used to alter the original surface normals of the low resolution model. The surface normals are altered in a manner which mimics the surface normals of the more detailed high resolution model. This fools the eye into believing that the surface has more detail than it really does because of the way the lighting reacts with the normal at each pixel. The surface does not really include the extra detail, but it appears like it does because of the changes in the lighting equation due to the change in the normal direction of the surface. This technique can be applied in real-time to significantly improve the appearance of the relatively low resolution models used in video games.

In general, one embodiment of the present invention provides a method of adding features and/or details to three-dimensional models that is driven by alpha blending a normal map based off of bone or joint translation/position. In some embodiments, a normal map is used to add details to specific regions of three-dimensional models based on the movements of one or more joints in the model. And in some embodiments, the locations of the specific regions for which detail is to be added are determined based on the positions or movements of one or more joints in the model.

Figure 1:
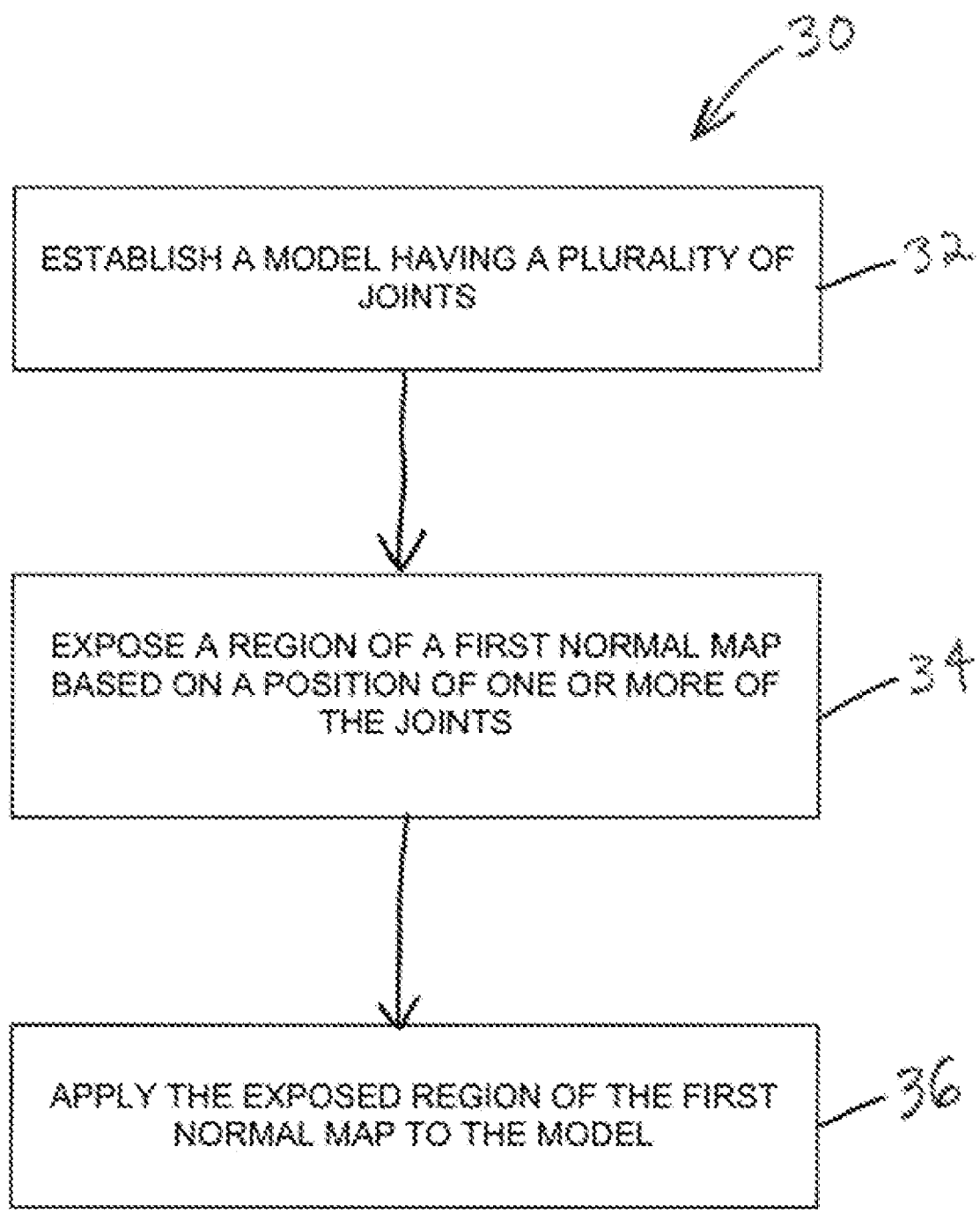
FIG. 1 is a flow diagram illustrating a method for use in animation in accordance with an embodiment of the present invention.

Referring to FIG. 1, there is a method 30 in accordance with an embodiment of the present invention. In step 32 a model is establishing having a plurality of joints. In step 34 a region of a first normal map is exposed based on a position of one or more of the joints. And in step 36 the exposed region of the first normal map is applied to the model.

Figure 2:
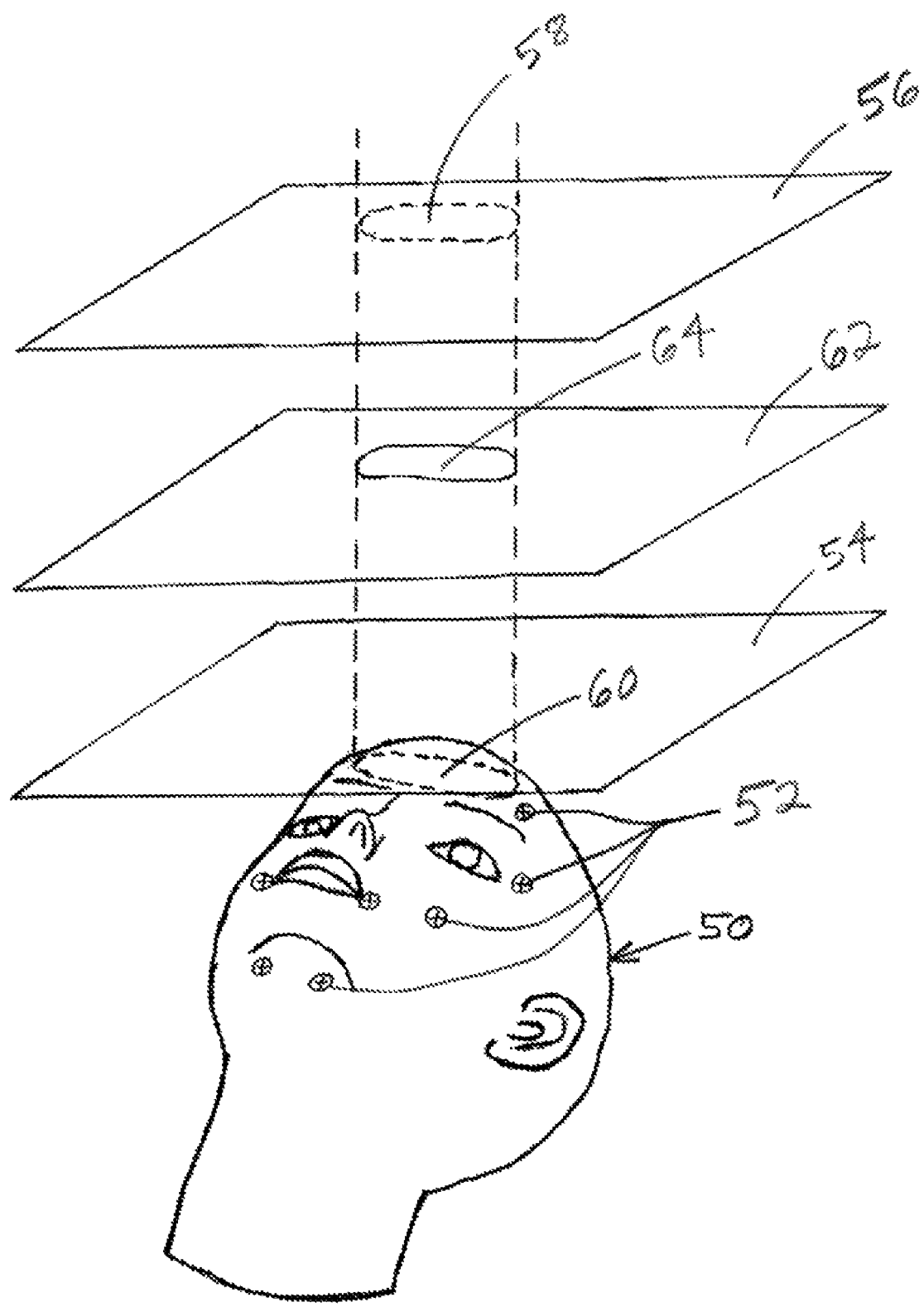
FIG. 2 is an exploded, pictorial view illustrating an application of the method shown in FIG. 1 in accordance with an embodiment of the present invention.

An example application of the method 30 in accordance with an embodiment of the present invention will be described with reference to FIG. 2. This example application may be used in animation for applying wrinkles or other details to specific regions of a character's face.

Specifically, a three-dimensional model 50 of a character's head is established. The model 50 includes a plurality of joints 52 that control the character's facial movements. A neutral normal map 54 containing static details, such as for example permanent wrinkle traces, pores, etc., may optionally be applied to the model 50.

A normal map 56 containing dynamic wrinkles or other details that would appear on an average face in various contractions is layered on top of or above the neutral normal map 54. This normal map 56 may also be referred to as a "wrinkle map" or "detail map". In accordance with an embodiment of the present invention, a specific region of the normal map 56, such as for example the region indicated at 58, may be exposed based on a position of one or more of the joints 52 in the model 50. The locations of the specific regions of the normal map 56 that get exposed may be determined based on the positions or movements of one or more joints 52 in the model 50. Thus, the positions or movements of one or more joints 52 may be used to select the regions of the normal map 56 to be applied.

The exposed region 58 of the normal map 56 is then applied to the model 50. For example, the model 50 may be rendered using the exposed region 58 of the normal map 56 in lighting pixels. In the illustrated example this results in wrinkles or other details being provided in the forehead region 60 of the model 50. In embodiments where the neutral normal map 54 is used, the exposed regions of the normal map 56 may be superimposed onto the neutral normal map 54. Thus, application of various different exposed regions of the normal map 56 to the model 50 may be used to provide wrinkles in specific regions of the face to create different facial expressions.

In some embodiments an alpha map 62 may be used to expose the specific regions of the normal map 56. Furthermore, the alpha map 62 may be used to control the locations of the exposed regions of the normal map 56. This may be accomplished by controlling an opacity value of the alpha map 62 based on the position of one or more of the joints 52 in the model 50. Namely, the position of one or more of the joints 52 in the model 50 may be used to control the opacity value of a specific region of the alpha map 62. For example, changing the opacity value of the specific region 64 of the alpha map 62 may be used to allow the corresponding region 58 of the normal map 56 to be exposed to the model 50.

In some embodiments the method 30 (FIG. 1) may, for example, be used in real-time applications, such as video games or the like. For example, the model may be rendered in real-time using the exposed region of the normal map in lighting pixels. In some embodiments, specific regions of the normal map may be dynamically exposed in real-time based on the movements of one or more of the joints in the model. Then, the exposed regions of the normal map may be dynamically applied in real-time to the model. This allows wrinkles or other details to be applied to specific regions of the face in real-time based on facial movements.

With respect to real-time applications, the method 30 may be used to provide a real-time dynamic shader that may be used in computer animation in accordance with an embodiment of the present invention. An example of such a shader will now be described for a scenario similar to as described above where wrinkles or other details are applied to specific regions of a character's face. It should be well understood, however, that in other embodiments of the present invention the teachings and techniques described herein may be used to apply any type of features or details to models representing any type of structure, whether animate or inanimate.

The embodiment of the real-time dynamic "wrinkle" shader described herein animates high frequency details, such as dynamic wrinkle-patterns, that cannot otherwise be efficiently generated using conventional geometry deformation techniques. The low frequency deformations are separated from the high frequency details by using low resolution geometry for the broad facial deformations and dynamic texture maps (normal maps) for the finer details. It has been found to be efficient to create the broad facial movements by actually transforming vertices via skin clusters on a fairly low resolution geometry and to generate finer details such as dynamic wrinkles using normal maps. The shader may be used in conjunction with computer generated (CG) characters that employ common smooth skin deformations.

The embodiment of the real-time dynamic wrinkle shader described herein uses a defined set of key "facial expressions" that would each benefit from detailed wrinkles or other details in order to be more readable and more effectively convey emotion. A normal or "wrinkle" map is generated that includes the data for these expressions. In some embodiments, a single normal map may contain all of the different dynamic wrinkles that would appear on an average face in various contractions.

For example, such a normal or wrinkle map may be created utilizing the following workflow. First, a blendshape of the desired facial expression that is to be detailed is generated. For example, for a "brows up" facial movement the animation controls of the facial rig are used to raise the eyebrows of the model into their extreme position. The resulting shape is exported into a high resolution modeling package to be used as a template for an artist to add the high frequency details that the particular expression requires, i.e. forehead wrinkles. By way of example, a modeling package that may be used for this task is ZBRUSH® available from Pixologic, Inc. The added geometric details are then exported as a normal or wrinkle map. The wrinkle map may be layered on top of a neutral normal map containing all the static details, such as permanent wrinkle traces, pores, etc.

In some embodiments, in order to locally control the appearance of the details in the wrinkle map, greyscale alpha maps may be used similar to as described above. Such alpha maps may be generated or created using a two-dimensional (2D) image processing package, such as for example PHOTOSHOP® available from Adobe Systems Incorporated. The alpha maps are created to locally expose the particular facial region of the wrinkle map, such as for example the forehead so that the forehead wrinkles may be applied to the model.

The system utilizes the joint transformations in the three-dimensional model which generate the broader facial movements to animate shader attributes, which in turn control the wrinkle display. In some embodiments the joint transformations may be used to control the alpha maps so that the shader regulates the display of predefined areas of the wrinkle map using blended alpha maps. That is, the alpha blending may be controlled directly by the translation of the joints in the facial rig. The translation value of selected control joints animates the opacity of their related alpha map. Based on the opacity value of a given alpha map, the wrinkle map is locally superimposed on the neutral map. In this way the set of alpha maps may be used to precisely control which region of the dynamic wrinkle map is revealed or masked. This provides for a dynamic and reactive wrinkle system.

In some embodiments, the character's face may be divided into a predefined number of regions which may show wrinkles independently. In the present example, the character's face is divided into seven regions in UV-space which may show wrinkles independently. Table 1 below is an example breakdown that may be used as a guideline. The table illustrates the alpha regions along with their related controllers. It should be well understood, however, that the choice and number of wrinkle-zones in other embodiments of the present invention may be reduced or increased based on the specific requirements and limitations of a given project.

TABLE 1

| Alpha Region | Control Joints | Translation Vector |
| --- | --- | --- |
| 1) horizontal forehead wrinkles LEFT | Left Outer Brow | +Y |
| 2) horizontal forehead wrinkles RIGHT | Right Outer Brow | +Y |
| 3) angry Brow (vertical wrinkles between the brows) | Inner Brow | −Y |
| 4) crows feet wrinkles surrounding eyes LEFT | Left Cheek | +Y |
| 5) crows feet wrinkles surrounding eyes RIGHT | Right Cheek | +Y |
| 6) deepening of nasolabial folds LEFT | Left Mouth Corner | −Z |
| 7) deepening of nasolabial folds RIGHT | Right Mouth Corner | −Z |

The translation vector indicates the direction of the movement of the control joint, examples of which are provided below.

Figure 3A:
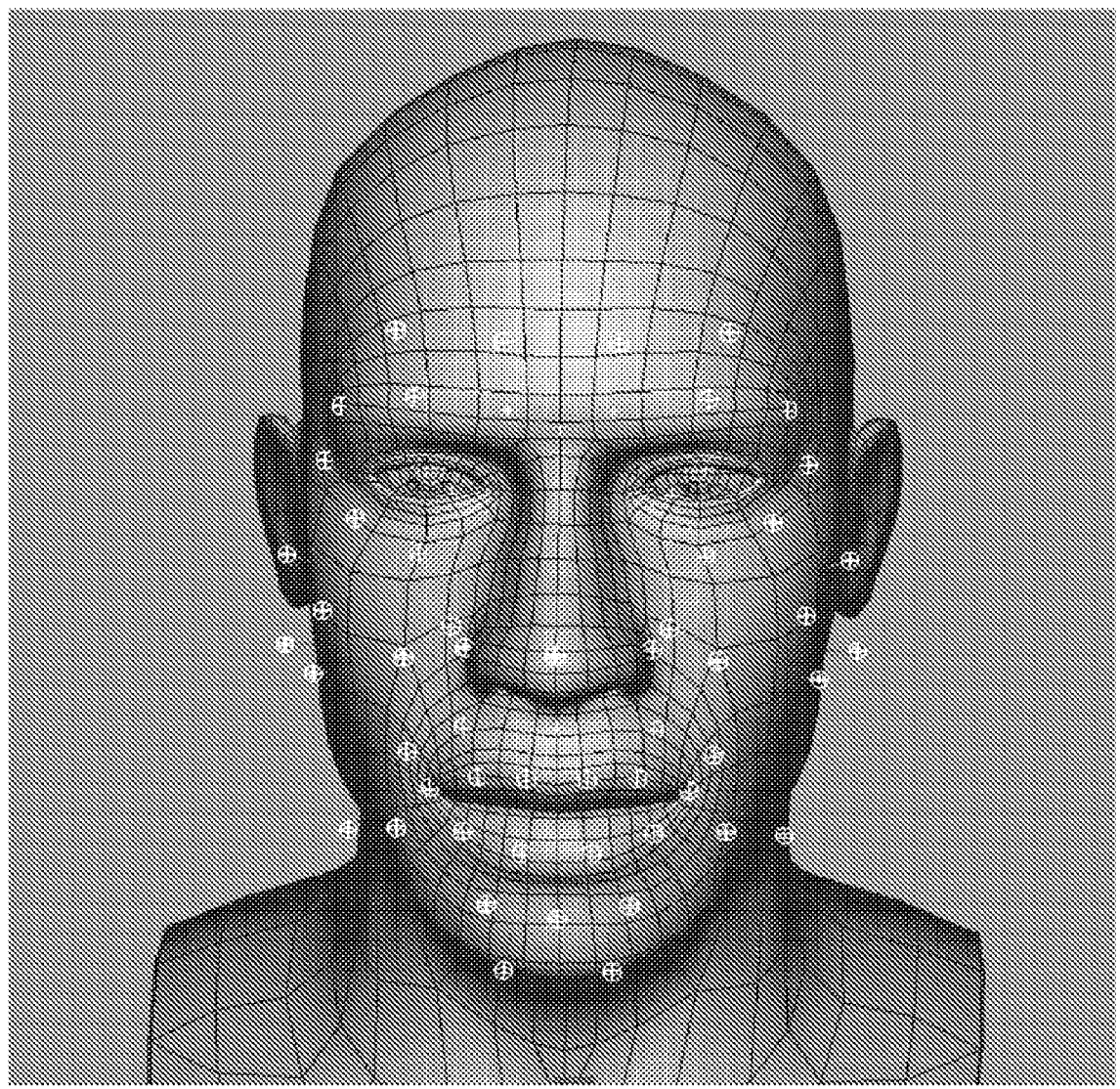
FIGS. 3A, 3B, 3C, and 3D are screen shots illustrating a neutral pose for an application of the method shown in FIG. 1 in accordance with an embodiment of the present invention.

An example operation of the real-time dynamic wrinkle shader will now be described. Specifically, FIG. 3A illustrates a three-dimensional model of a character's head that includes a plurality of joints that control the character's facial movements. In this figure the character's face is in a neutral pose, i.e. there is no translation of any of the joints. For example, the brow joint is neutral in this pose.

Figure 3B:
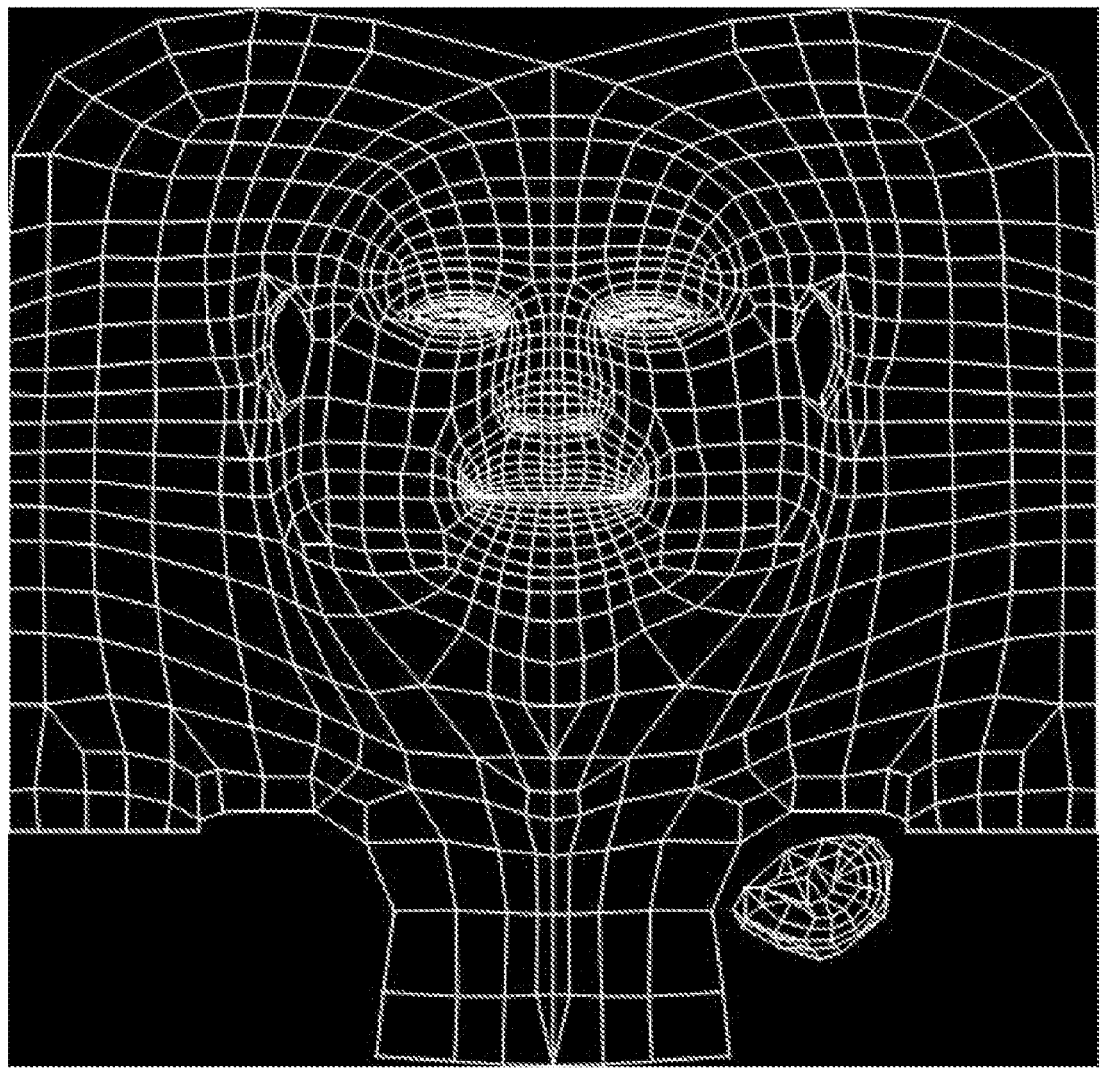

Because the character's face is in a neutral pose there is no need for the addition of any wrinkles from the wrinkle map. As such, the alpha map is invisible so that no portion of the wrinkle map is exposed. FIG. 3B illustrates the alpha map being invisible and also illustrates the UV-Map as reference.

Figure 3C:
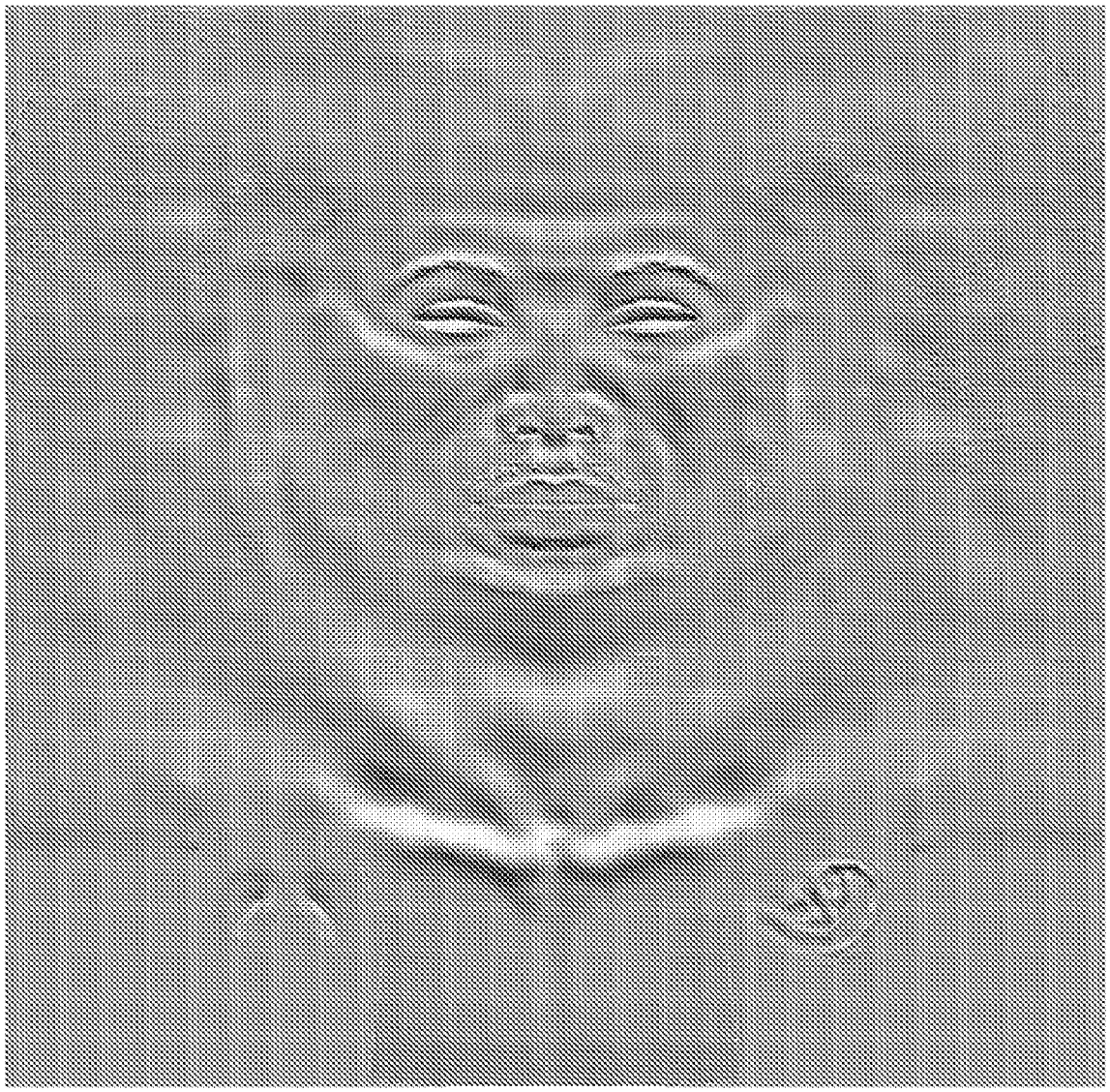

FIG. 3C illustrates the base or neutral normal map. The neutral normal map may contain the static details, such as for example permanent wrinkle traces, pores, etc. In the illustrated neutral pose it may be the only normal map that is applied. Again, in this example the wrinkle map is transparent for the neutral pose.

Figure 3D:
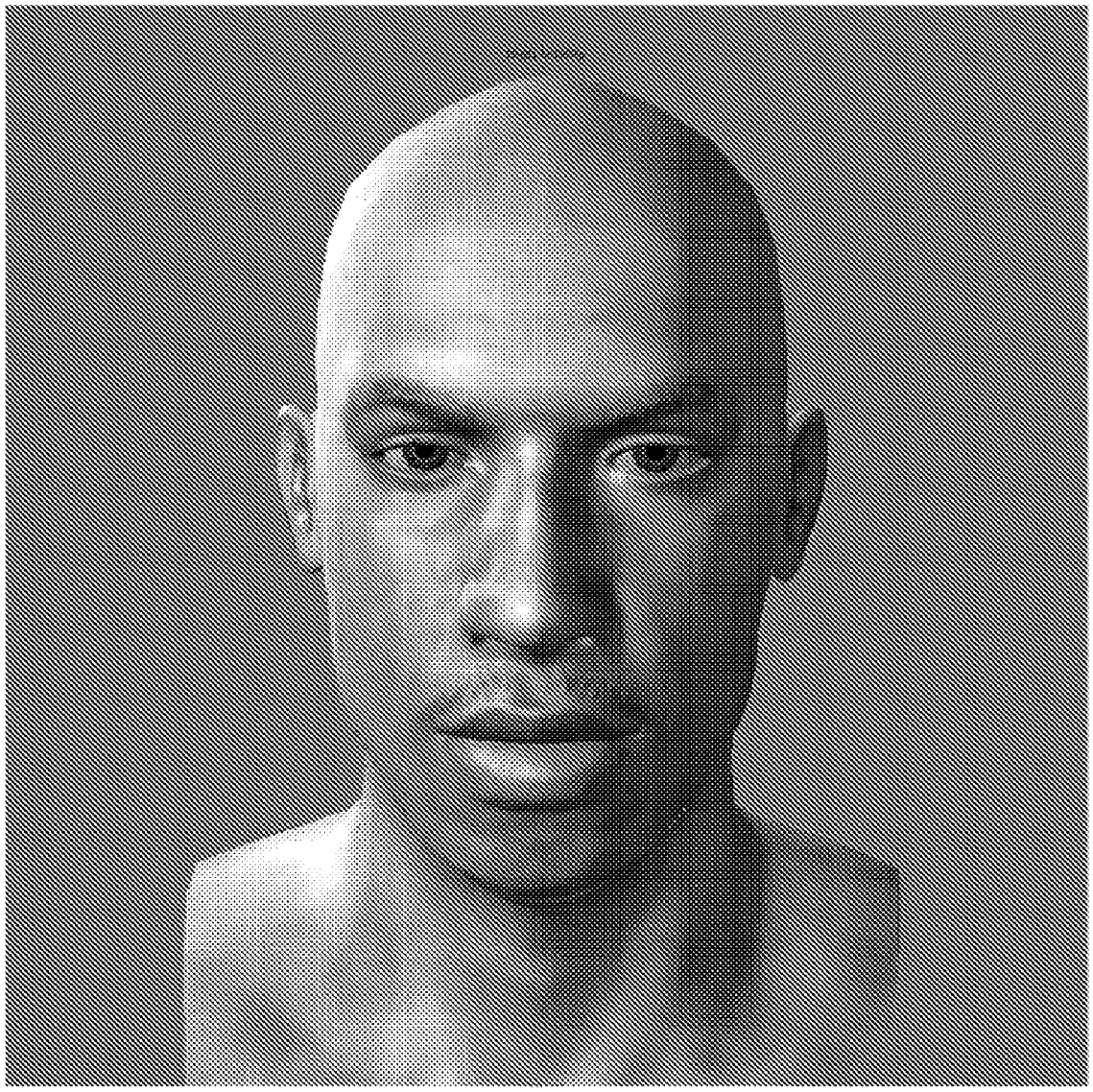

FIG. 3D illustrates the final result. As shown no dynamic wrinkles are added or show in the neutral expression or pose.

Figure 4A:
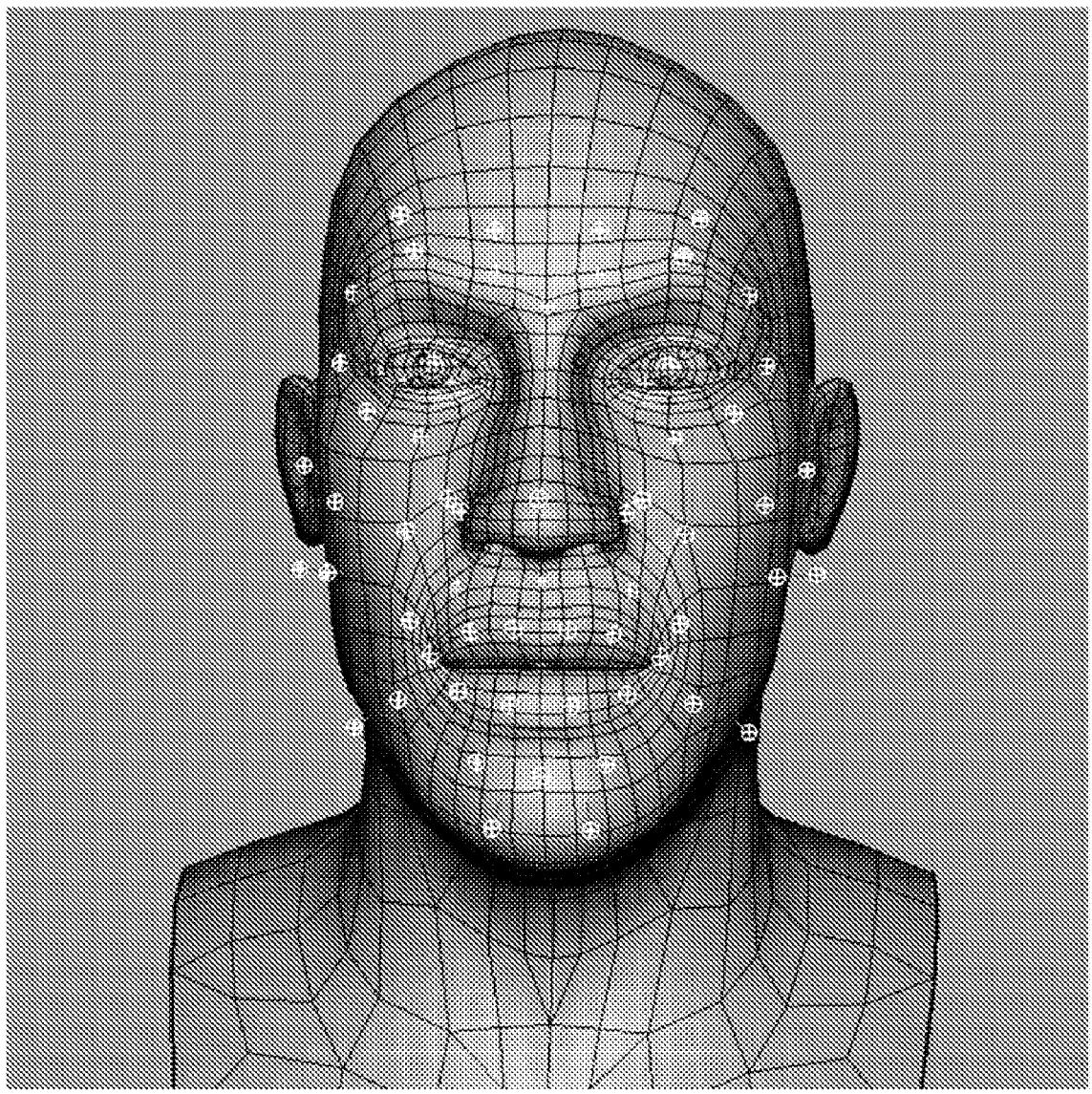
FIGS. 4A, 4B, 4C, and 4D are screen shots illustrating a "brows up" pose for an application of the method shown in FIG. 1 in accordance with an embodiment of the present invention.

FIGS. 4A, 4B, 4C and 4D illustrate the manner in which relationships may be defined between the joint configuration of a given facial movement and the appearance of specific, related wrinkle patterns in the appropriate region in accordance with an embodiment of the present invention. For example, FIG. 4A illustrates the joint translation for a "brows up" or "brow raise" pose. As shown, this pose transforms the brow joint upwards, which corresponds to a positive Y movement, which lifts up the skinned forehead geometry. Thus, the outer brow joint translates in the +Y direction.

Figure 4B:

FIG. 4B illustrates the alpha map fading for the "brows up" pose. Namely, the positive Y joint translation value is input into the shader to control the alpha map for the brow region, which makes the "brows" portion of the alpha map visible.

Figure 4C:
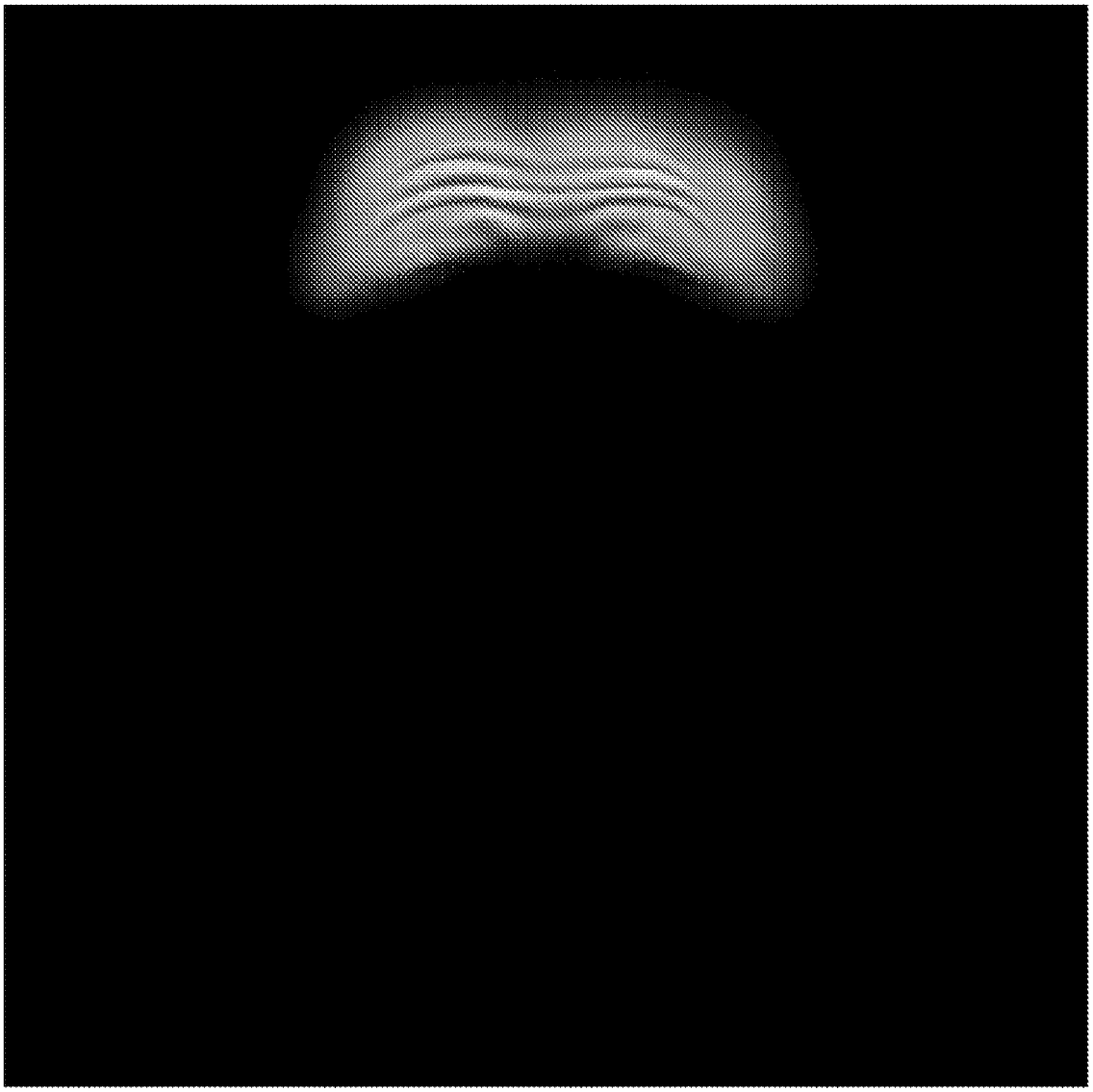

FIG. 4C illustrates the wrinkle map emergence. That is, the brow region of the wrinkle map is exposed by the alpha map. Namely, the alpha map is controlled in such a way that the dynamic wrinkle map becomes opaque only in the brow region, causing the forehead wrinkles to display.

Figure 4D:
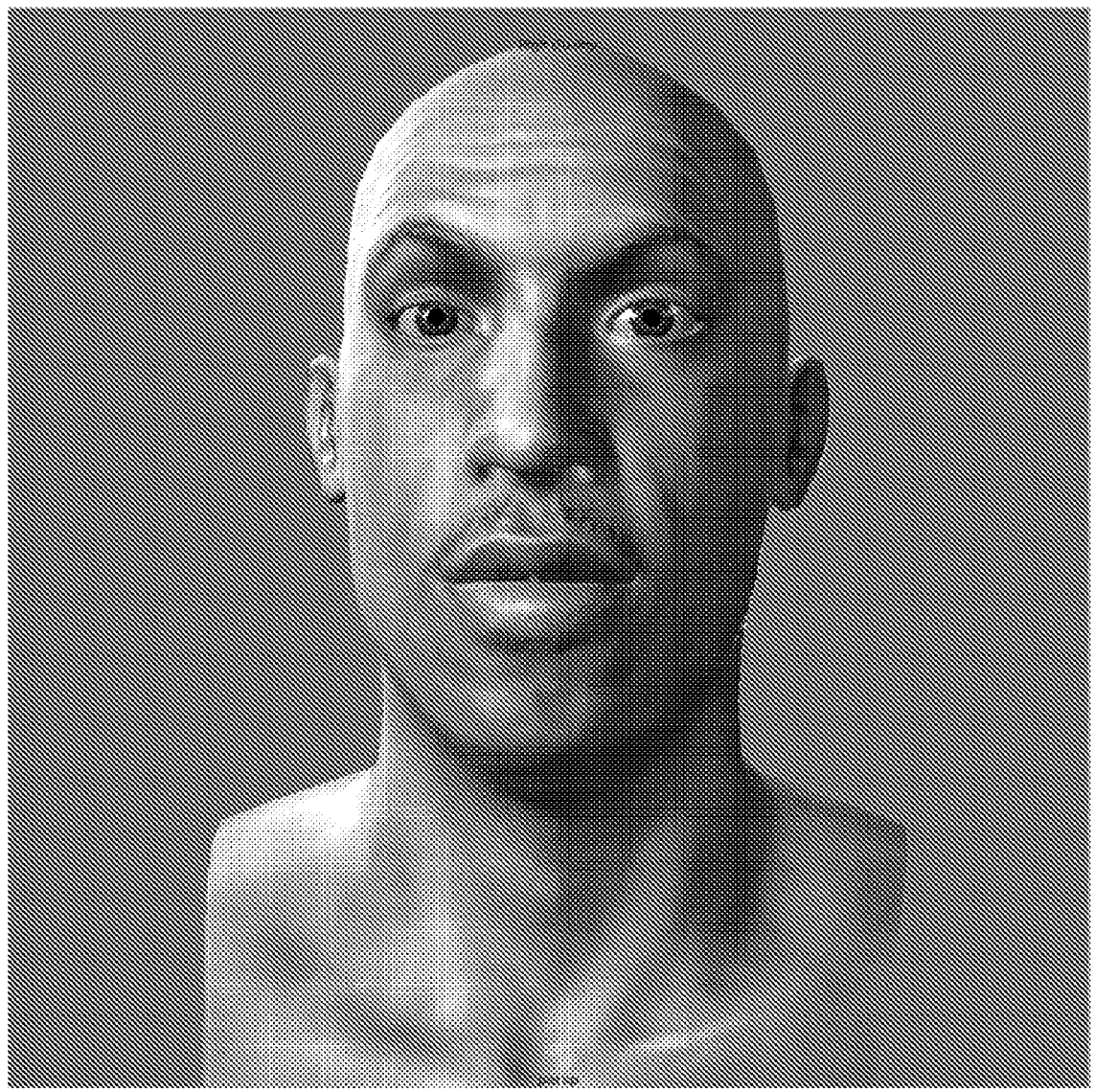

FIG. 4D illustrates the final result, namely, the brow wrinkles show on the three-dimensional model.

Figure 5A:
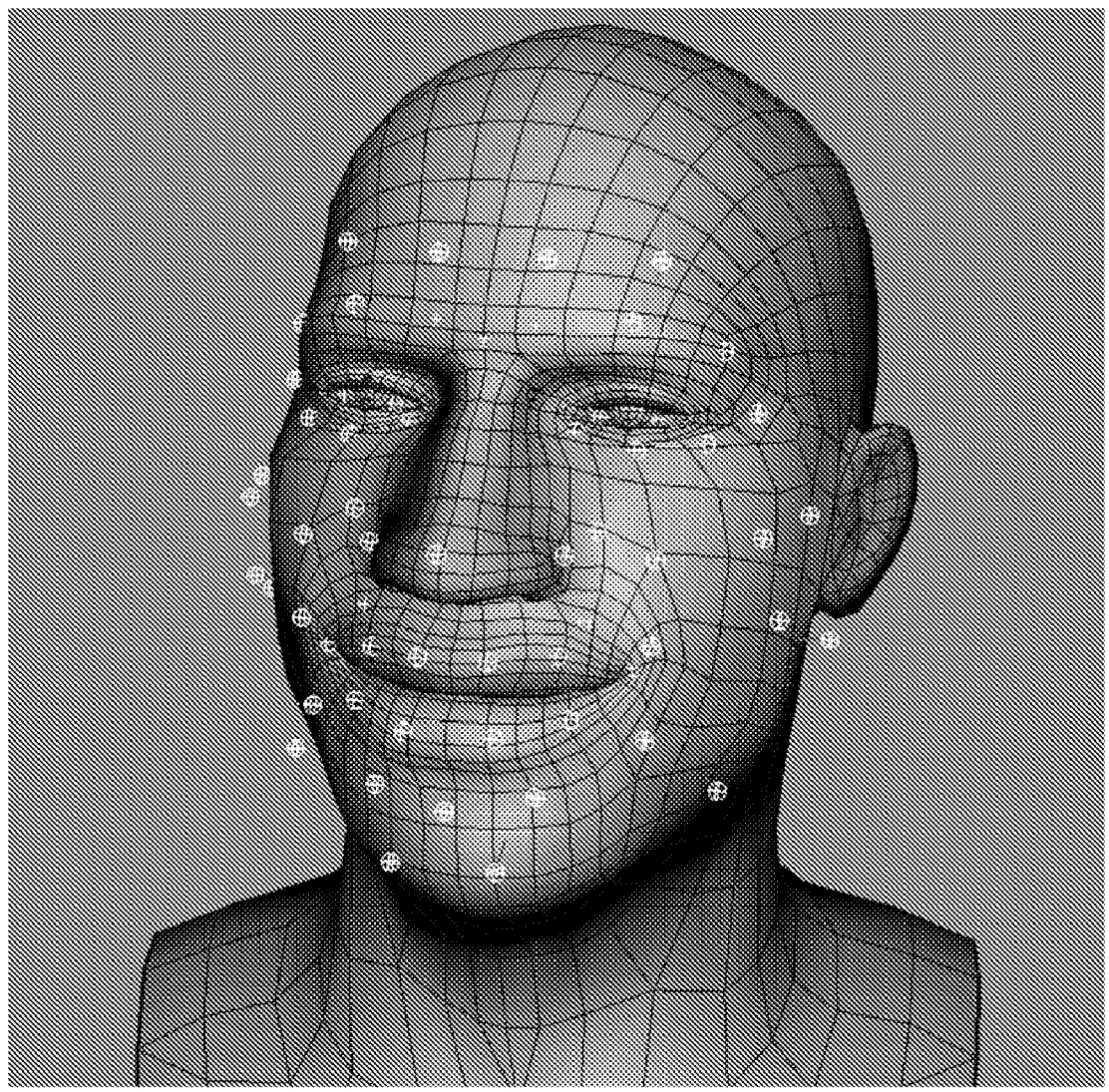
FIGS. 5A, 5B, 5C, and 5D are screen shots illustrating a smile pose for an application of the method shown in FIG. 1 in accordance with an embodiment of the present invention.

FIGS. 5A, 5B, 5C and 5D illustrate another example relationship between the joint configuration of a given facial movement and the appearance of specific, related wrinkle patterns in the appropriate region in accordance with an embodiment of the present invention. Namely, FIG. 5A illustrates the joint translation for a smile, which is a compound expression. As shown, the cheek joint translates in the +Y direction and the mouth corner joint translates in the −Z direction.

Figure 5B:
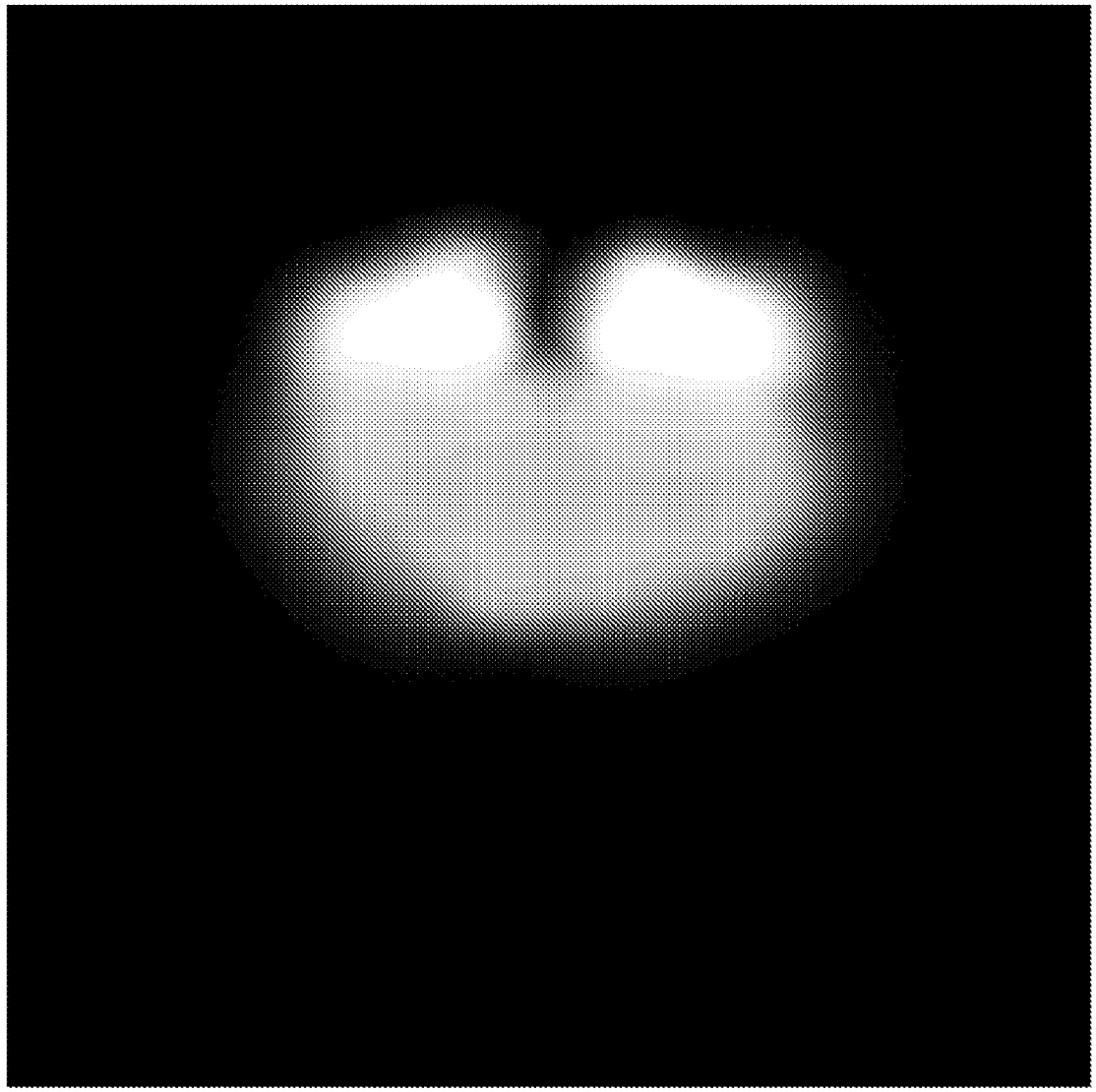

FIG. 5B illustrates the alpha map fading for the smile pose. As shown, "crows feet" and "smile fold" alpha maps become visible.

Figure 5C:
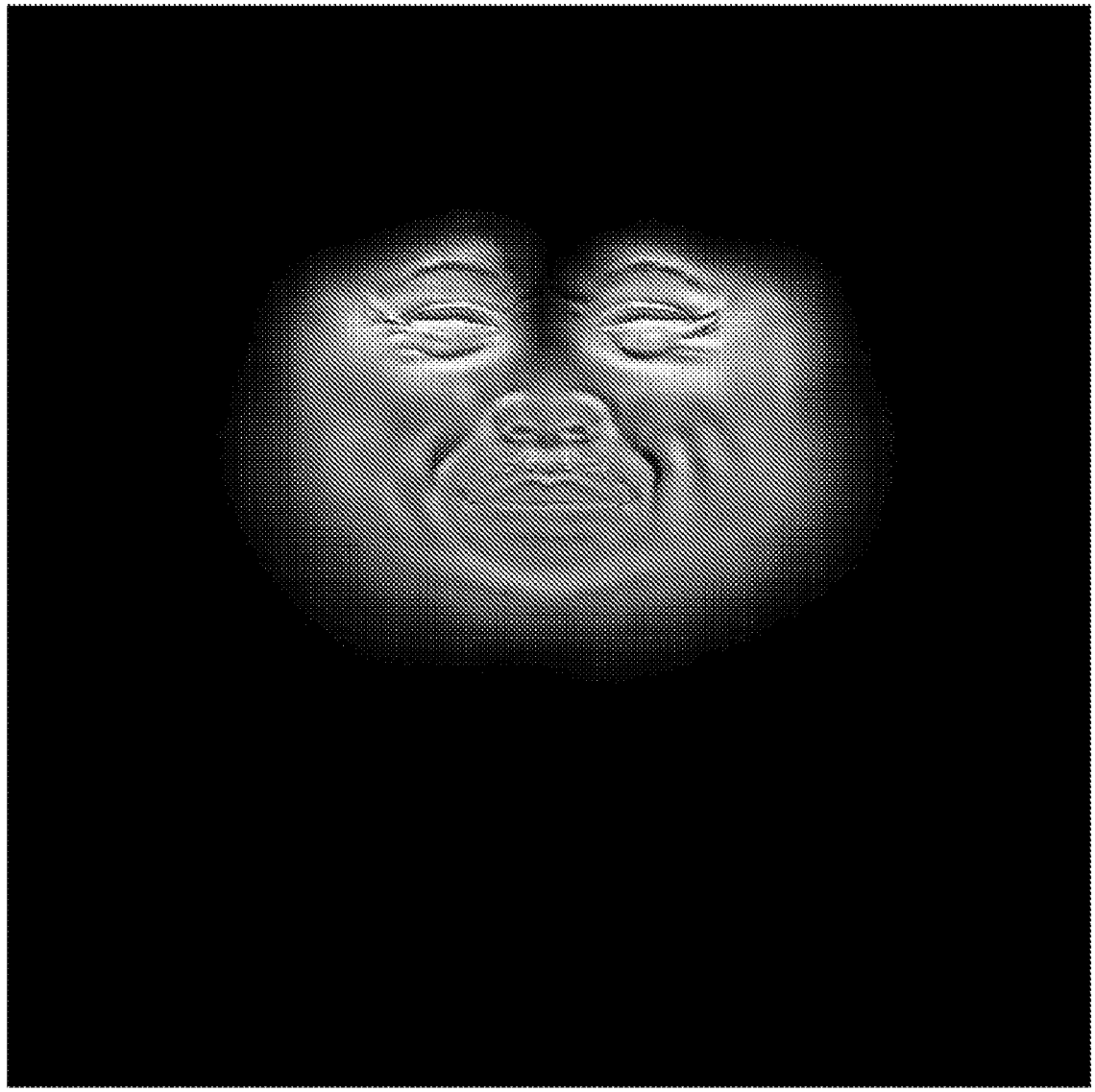

FIG. 5C illustrates the wrinkle map emergence. As shown, the eye region and cheek folds of the wrinkle map are exposed by the alpha map.

Figure 5D:
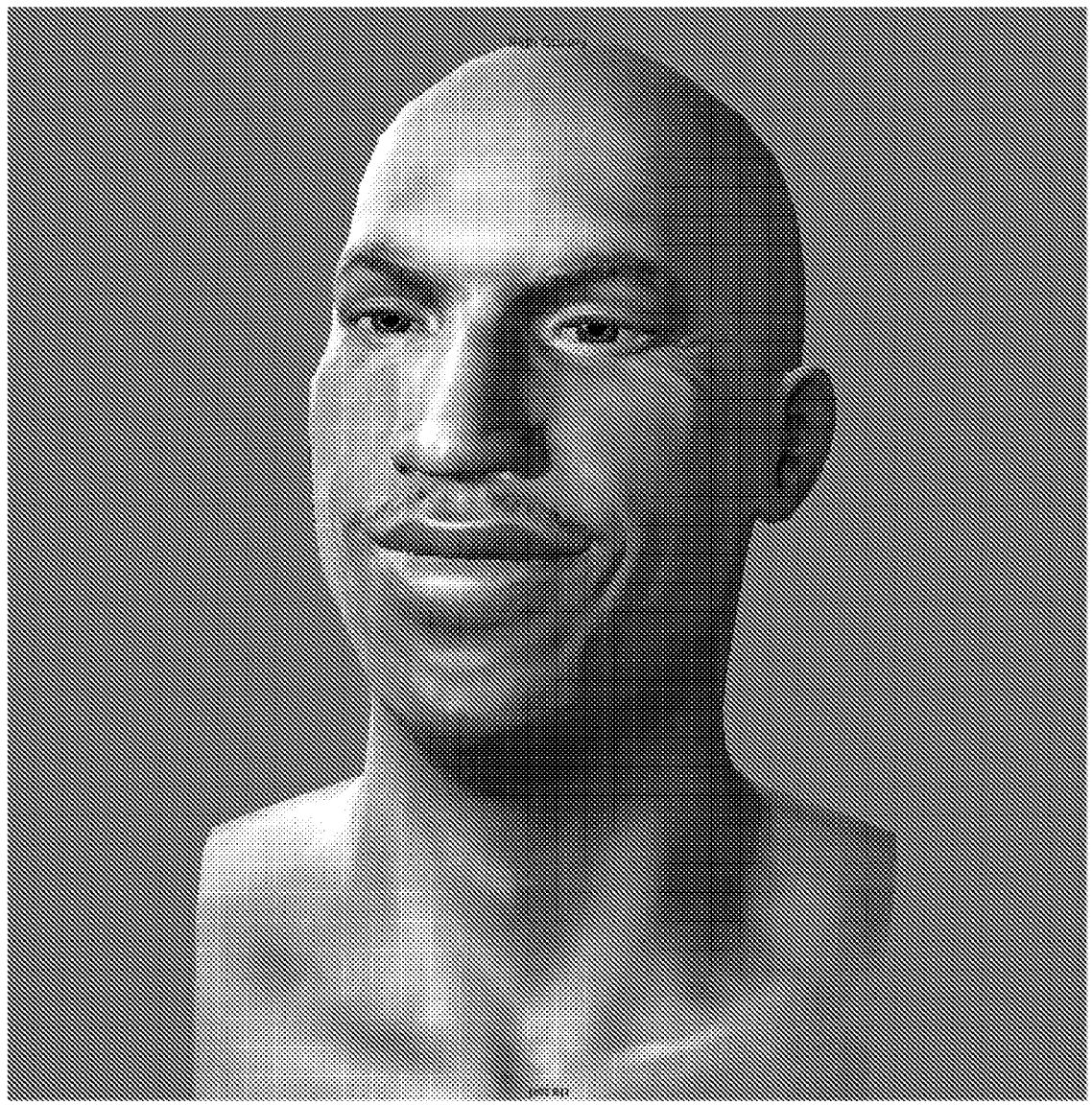

The final result is illustrated in FIG. 5D, which shows the crows feet and smile folds showing on the three-dimensional model.

The relationships between the joint configurations and their appropriate wrinkle-patterns may be fine-tuned by an artist/animator going through an iterative process of setting extreme facial poses and testing the wrinkle behaviors. For each key pose that is to be set up for wrinkles, it may be desirable in some embodiments to find the most logical relationship between the joint position of the control rig and the related intensity value of its alpha map. In such embodiments the validity of this relationship may help to ensure that anytime the geometry is deformed by the joints the correct wrinkles will be displayed.

The timing of the wrinkle display in relation to the geometric deformation of the model may also be considered in accordance with embodiments of the present invention. For example, in some embodiments having the timing of the wrinkle display in relation to the geometric deformation be nonlinear may help it to appear more realistic. Namely, it has been observed that wrinkle patterns may not emerge in a linear fashion. Instead, wrinkle patterns may have a natural "ease in" that in some cases may cause them to only start emerging after about half the distance of the joint translation has already been covered. It is believed that as a rule of thumb, with relation to the broad movements of the face, wrinkles display at a slower rate first and become intense more quickly at the peak of the slope of the joint translation. Therefore, in some embodiments more believable results may be achieved if the attack and decay of the wrinkle display are regulated with curve relationships.

The methods and techniques outlined above may be used for the efficient generation of animated characters having highly detailed features, such as for example highly detailed facial expressions. The automated, reactive setup of the "wrinkle maps" and the relationships set up between the broad facial movements (joint transformations) and the emergence of the finer details (alpha-blended normal maps) help to create cohesive facial expressions that naturally contain all the characteristic elements necessary to be read correctly. The methods, techniques and solutions described herein, such as the above-described dynamic shader, are suitable for use in advanced real-time applications and engines, such as a cinematic game engine. Moreover, the methods and techniques described herein may be used with motion capture data as well as keyframe animation since the wrinkle maps are controlled on the deformer level (i.e. the joints).

It should be well understood that in other embodiments of the present invention the methods and techniques described herein may be used in many other types of applications and scenarios in addition to the examples provided herein. For example, the methods and techniques described herein may also be utilized to enhance other deformations of the face or body that cause subtle changes beyond wrinkles, such as adding and subtracting volume in controlled and subtle ways. For example, the methods and techniques may be used to make the eyelid pouches fuller when smiling. Other potential uses include veins popping around the neck, arms, and hands, and even neck folds appearing when turning the head. In addition to character animation, the methods and techniques described herein may also be utilized to detail cloth deformations by adding intricate fold patterns. Thus, the methods and techniques described herein have many other uses in addition to the wrinkle-solution described herein.

Figure 6:
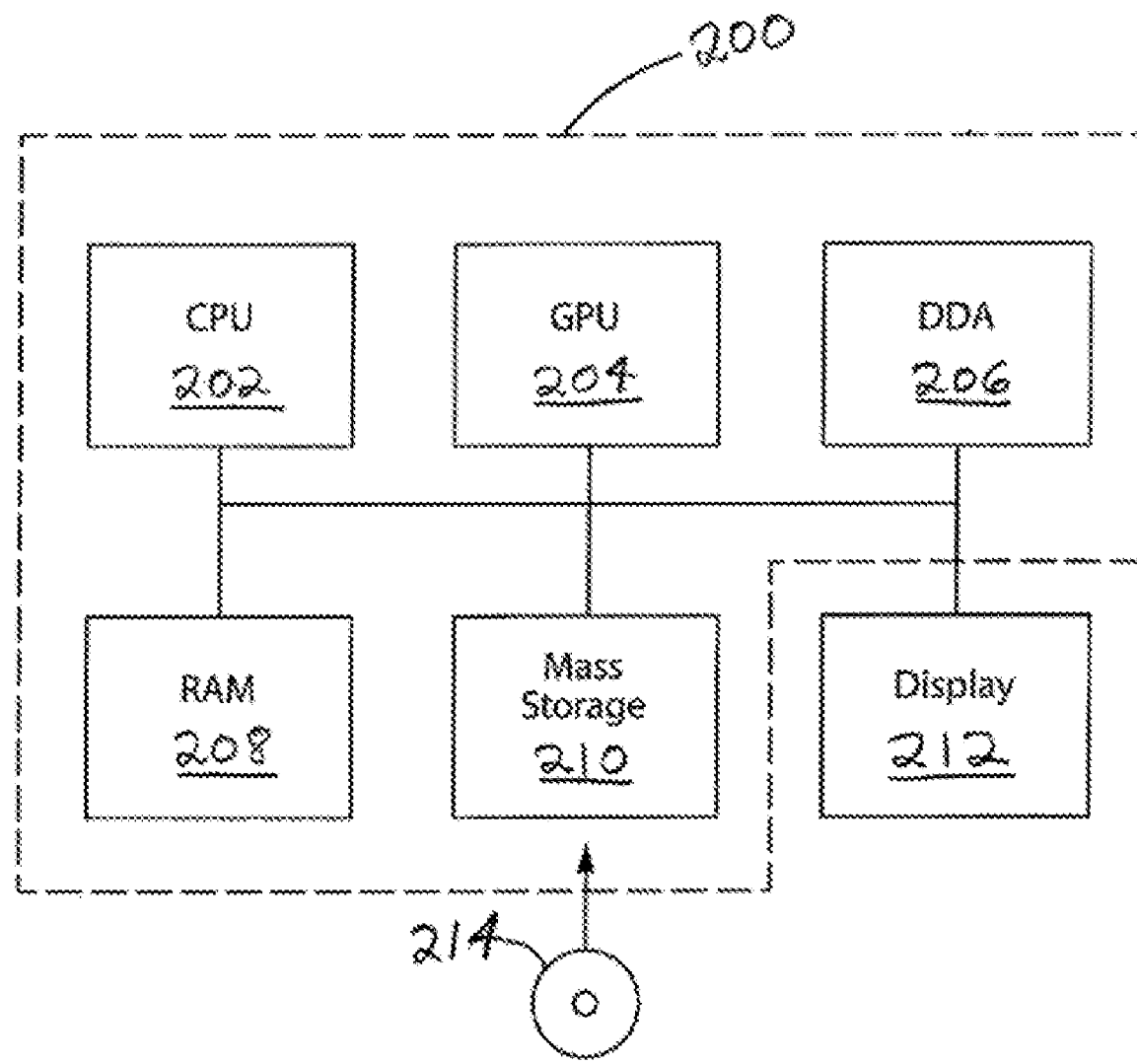
FIG. 6 is a block diagram illustrating a system that may be used to run, implement and/or execute the methods and techniques shown and described herein in accordance with embodiments of the present invention.

The methods and techniques described herein may be utilized, implemented and/or run on many different types of computers, graphics workstations, televisions, entertainment systems, video game systems, DVD players, DVRs, media players, home servers, video game consoles, and the like. Referring to FIG. 6, there is illustrated an example system 200 that may be used for such implementation. It should be well understood, however, the use of the system 200 in any of the embodiments described herein is certainly not required.

By way of example, the system 200 may include, but is not required to include, a central processing unit (CPU) 202, a graphics processing unit (GPU) 204, digital differential analysis (DDA) hardware 206, a random access memory (RAM) 208, and a mass storage unit 210, such as a disk drive. The system 200 may be coupled to, or integrated with, a display 212, such as for example any type of display.

The CPU 202 and/or GPU 204 can be used to execute or assist in executing the steps of the methods and techniques described herein, and various program content, images, models, animations, characters, video games, etc., can be rendered on the display 212. Removable storage media 214 may optionally be used with the mass storage unit 210, which may be used for storing code that implements the methods and techniques described herein. However, any of the storage devices, such as the RAM 208 or mass storage unit 210, may be used for storing such code. Either all or a portion of the system 200 may be embodied in any type of device, such as for example a computer, workstation, television, video game console or system, or any other type of device, including any type of device mentioned herein.

While the invention herein disclosed has been described by means of specific embodiments and applications thereof, numerous modifications and variations could be made thereto by those skilled in the art without departing from the scope of the invention set forth in the claims.

What is claimed is:

1. A method for use in animation, comprising the steps of:
establishing a model having a plurality of joints;
exposing a first region of a first normal map based on a position of one or more of the joints, wherein the exposing comprises dynamically exposing the first region of the first normal map based on movements of one or more of the joints, and wherein the first region is smaller than an entire area of the first normal map, and regions of the first normal map outside of the first region are not exposed; and
applying the exposed first region of the first normal map to the model, wherein the applying comprises rendering the model using the exposed first region of the first normal map in lighting pixels, and wherein the applying is performed by a processor-based device;
wherein the movements of the one or more of the joints determine a location of the first region within the first normal map that is exposed and applied to the model.

2. A method in accordance with claim 1, wherein the step of exposing further comprises the step of:
using an alpha map to expose the first region of the first normal map.

3. A method in accordance with claim 1, wherein the step of exposing further comprises the step of:
using an alpha map to control the location of the exposed first region of the first normal map.

4. A method in accordance with claim 1, wherein the step of exposing further comprises the step of:
controlling an opacity value of an alpha map based on the position of the one or more of the joints to expose the first region of the first normal map.

5. A method in accordance with claim 1, wherein the rendering further comprises:
rendering the model in real-time using the exposed first region of the first normal map in lighting pixels.

6. A method in accordance with claim 1, wherein the step of exposing further comprises:
dynamically exposing in real-time the first region of the first normal map based on movements of one or more of the joints.

7. A method in accordance with claim 1, wherein the step of applying further comprises:
dynamically applying in real-time the exposed first region of the first normal map to the model.

8. A method in accordance with claim 1, further comprising the step of:
superimposing the exposed first region of the first normal map onto a second normal map.

9. A method in accordance with claim 1, wherein the model comprises a character's face and the first normal map is configured to provide wrinkles on the face.

10. A method in accordance with claim 8, wherein:
the first normal map comprises a plurality of different dynamic wrinkles that appear on the model in various contractions; and
the second normal map comprises a neutral normal map that includes static details that appear on the model.

11. A system for use in animation, comprising:
means for establishing a model having a plurality of joints;
means for exposing a first region of a first normal map based on a position of one or more of the joints, wherein the exposing comprises dynamically exposing the first region of the first normal map based on movements of one or more of the joints, and wherein the first region is smaller than an entire area of the first normal map, and regions of the first normal map outside of the first region are not exposed; and
means for applying the exposed first region of the first normal map to the model, wherein the applying comprises rendering the model using the exposed first region of the first normal map in lighting pixels;
wherein the movements of the one or more of the joints determine a location of the first region within the first normal map that is exposed and applied to the model.

12. A system in accordance with claim 11, wherein the means for exposing further comprises:
   means for using an alpha map to expose the first region of the first normal map.

13. A system in accordance with claim 11, wherein the means for exposing further comprises:
   means for using an alpha map to control the location of the exposed first region of the first normal map.

14. A system in accordance with claim 11, wherein the means for exposing further comprises:
   means for controlling an opacity value of an alpha map based on the position of the one or more of the joints to expose the first region of the first normal map.

15. A system in accordance with claim 11, wherein the rendering further comprises:
   rendering the model in real-time using the exposed first region of the first normal map in lighting pixels.

16. A system in accordance with claim 11, wherein the exposing further comprises:
   dynamically exposing in real-time the first region of the first normal map based on movements of one or more of the joints.

17. A system in accordance with claim 11, wherein the applying further comprises:
   dynamically applying in real-time the exposed first region of the first normal map to the model.

18. A system in accordance with claim 11, further comprising:
   means for superimposing the exposed first region of the first normal map onto a second normal map.

19. A system in accordance with claim 11, wherein the model comprises a character's face and the first normal map is configured to provide wrinkles on the face.

20. A system in accordance with claim 18, wherein:
   the first normal map comprises a plurality of different dynamic wrinkles that appear on the model in various contractions; and
   the second normal map comprises a neutral normal map that includes static details that appear on the model.

21. A computer program product comprising a non-transitory medium for embodying a computer program for input to a computer and a computer program embodied in the medium for causing the computer to perform steps comprising:
   establishing a model having a plurality of joints;
   exposing a first region of a first normal map based on a position of one or more of the joints, wherein the exposing comprises dynamically exposing the first region of the first normal map based on movements of one or more of the joints, and wherein the first region is smaller than an entire area of the first normal map, and regions of the first normal map outside of the first region are not exposed; and
   applying the exposed first region of the first normal map to the model;
   wherein the movements of the one or more of the joints determine a location of the first region within the first normal map that is exposed and applied to the model.

22. A computer program product in accordance with claim 21, wherein the step of exposing further comprises the step of:
   using an alpha map to expose the first region of the first normal map.

23. A computer program product in accordance with claim 21, wherein the step of exposing further comprises the step of:
   using an alpha map to control the location of the exposed first region of the first normal map.

24. A computer program product in accordance with claim 21, wherein the step of exposing further comprises the step of:
   controlling an opacity value of an alpha map based on the position of the one or more of the joints to expose the first region of the first normal map.

25. A computer program product in accordance with claim 21, wherein the step of applying further comprises the step of:
   rendering the model in real-time using the exposed first region of the first normal map in lighting pixels.

26. A computer program product in accordance with claim 21, wherein the step of exposing further comprises:
   dynamically exposing in real-time the first region of the first normal map based on movements of one or more of the joints.

27. A computer program product in accordance with claim 21, wherein the step of applying further comprises:
   dynamically applying in real-time the exposed first region of the first normal map to the model.

28. A computer program product in accordance with claim 21, further comprising the step of:
   superimposing the exposed first region of the first normal map onto a second normal map.

29. A computer program product in accordance with claim 21, wherein the model comprises a character's face and the first normal map is configured to provide wrinkles on the face.

30. A computer program product in accordance with claim 28, wherein:
   the first normal map comprises a plurality of different dynamic wrinkles that appear on the model in various contractions; and
   the second normal map comprises a neutral normal map that includes static details that appear on the model.

* * * * *

UNITED STATES PATENT AND TRADEMARK OFFICE
CERTIFICATE OF CORRECTION

PATENT NO. : 8,115,774 B2
APPLICATION NO. : 11/460936
DATED : February 14, 2012
INVENTOR(S) : Christoph Alexander Biehn et al.

Page 1 of 1

It is certified that error appears in the above-identified patent and that said Letters Patent is hereby corrected as shown below:

On Page 1, Column 2, in Line 1 of the Abstract, delete "method." and insert --method--, therefor.

Signed and Sealed this
Eighth Day of May, 2012

David J. Kappos
*Director of the United States Patent and Trademark Office*